Patented Jan. 5, 1954

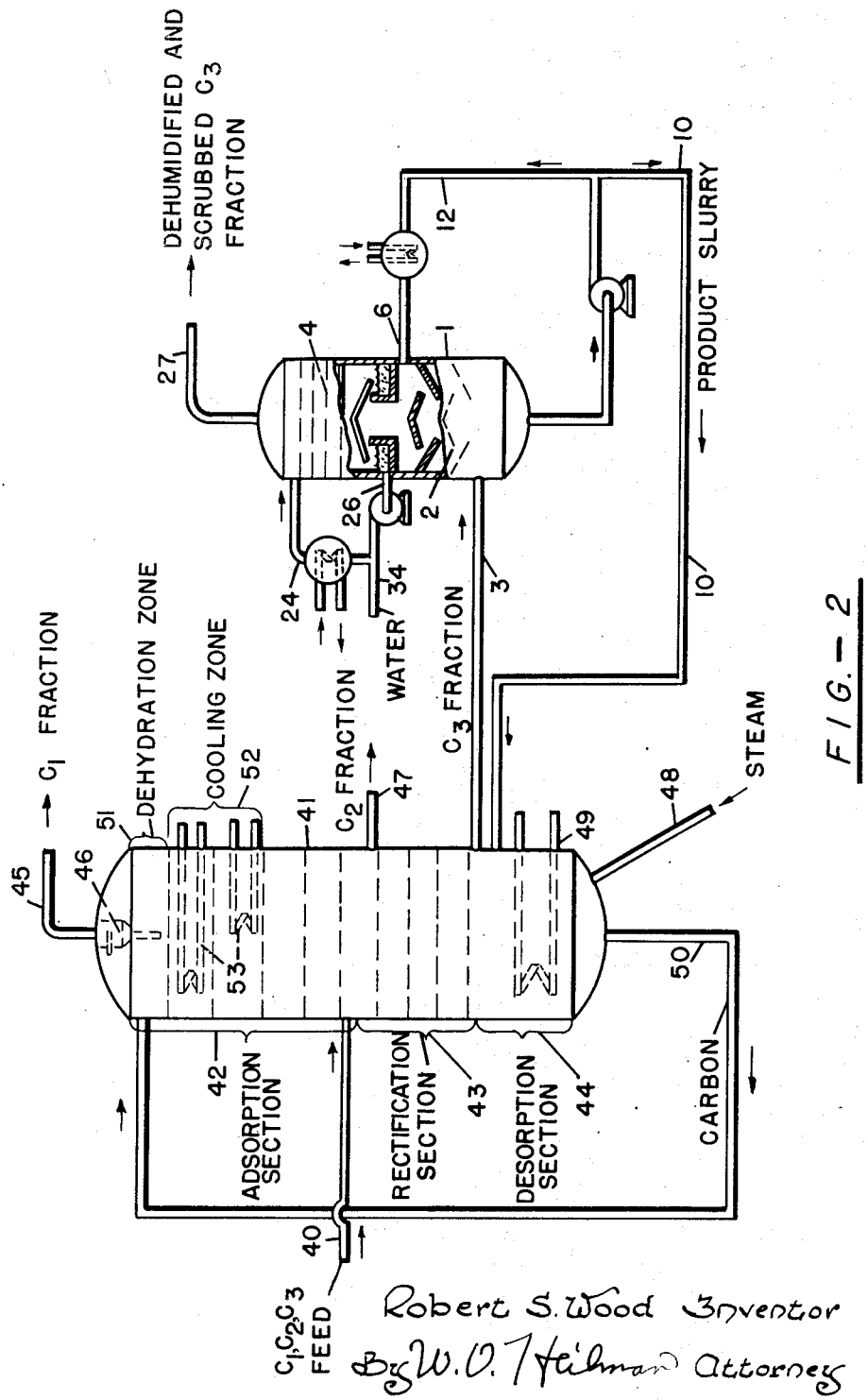

2,664,968

UNITED STATES PATENT OFFICE 2,664,968

PROCESS FOR RECOVERING VAPORS AND SOLIDS FROM GAS STREAMS

Robert S. Wood, Elizabeth, N. J., assignor to Standard Oil Development Company, a corporation of Delaware Application August 30, 1952, Serial No. 307,270

3 Claims. (Cl. 183—120)

This invention concerns an improved method for recovering condensible vapors and finely divided solids from gas streams containing these materials. It further concerns an improved method for recovering the finely divided solids in the form of a slurry that is capable of being pumped. It especially relates to an improved method for scrubbing finely divided solids and for condensing steam or water vapor from hydrocarbon gas streams containing these substances, and for controlling the concentration of the slurry resulting from simultaneous removal of solids and water vapor. It has particular application to adsorption processes used for fractionating gaseous hydrocarbon mixtures wherein the product streams contain large amounts of steam and particles of entrained adsorbent and it is desired to recover the entrained adsorbent. In this connection it especially concerns a method for separating steam and entrained finely divided activated carbon from the vapor product streams formed by fractionating a hydrocarbon gas mixture by means of a fluidized bed of activated carbon.

In many processes it becomes necessary to handle gas streams that contain entrained finely divided solid particles, large amounts of condensible vapors, and a non-condensing gas.

It is further often necessary to recover the particles of solid and to condense the vapors in order to isolate the desired non-condensing gaseous constituents. This situation exists particularly in fractional adsorption processes that are employed for fractionating mixtures of hydrocarbons. A specific example of such a process exists in the petroleum industry where finely divided adsorbents such as activated carbon and silica gel are used to fractionate mixtures of normally gaseous hydrocarbons. In these processes the product streams often contain large amounts of adsorbent stripping steam, along with small particles of the adsorbent. It therefore becomes necessary to remove both the steam and any entrained adsorbent from the product streams in order to isolate the desired non-condensing gaseous constituents.

In many processes, it is not only imperative that the gas stream be substantially freed of condensible vapors and entrained solids, but also that the solids be recovered as completely as possible. This is especially true in fractional adsorption processes and in catalytic processes such as hydroforming and hydrocarbon synthesis where the adsorbents and catalysts employed are relatively quite expensive. While adsorbent and catalyst losses are experienced in processes of the type described that utilize fixed or moving beds of adsorbent or catalyst, particularly high losses are experienced in those processes which employ beds of fluidized solids. For this reason the present invention has particular application in adsorption or catalytic processes that employ the fluidized solids technique.

For the purpose of illustration, the fluidized carbon adsorption process for fractionating mixtures of gaseous hydrocarbons may be used to demonstrate the value and operation of the present invention. In this process a mixture of gaseous hydrocarbons is fed to an adsorption zone in which it is passed countercurrently through a moving fluidized bed of an adsorbent such as activated carbon. The feed gas is generally introduced to the column at an intermediate point while the finely divided carbon is added at the top of the column. The hydrocarbon constituents of the feed that are preferentially least adsorbed rise through the bed and eventually pass out the top of the column. On the other hand, the constituents that are preferentially adsorbed by the carbon pass down the column with the carbon.

By controlling operating variables such as the hydrocarbon and activated carbon feed rates, the vapor reflux rates, and the temperatures existing within an adsorption column, it is possible to very efficiently fractionate a hydrocarbon mixture into two or more fractions. Generally speaking, the concentration of any given constituent of the feed mixture at any given point within the column depends upon the degree to which it is adsorbed by the carbon relative to the other constituents in the feed. The least adsorbed constituents migrate toward the top of the column; the most strongly adsorbed constituents adhere to the adsorbent and migrate toward the bottom of the column; and constituents adsorbed in intermediate degrees distribute themselves along the column.

A typical application of the fractional adsorption technique is the well-known process for fractionating mixtures of $C_1$, $C_2$ and $C_3$ hydrocarbons. When a mixture of these hydrocarbons is contacted with a fluidized bed of activated carbon in a column, $CH_4$ and lighter gases such as hydrogen, etc., pass unadsorbed to the top of the column, the $C_3$ to the bottom and the $C_2$ accumulates to an intermediate point. The $C_2$ hydrocarbons are desorbed from the carbon at an intermediate point along the column largely by $C_3$ vapors that are stripped from the carbon near the bottom of the column and refluxed back up the column.

The $C_1$ and $C_2$ fractions are usually withdrawn from the column directly as separate gas streams. The $C_2$ fraction is desorbed from the activated carbon by heating and contacting the carbon with a stripping medium such as steam. This stripping operation may be carried out either within a lower section of the main adsorption column or within an entirely separate column. In either case the $C_2$ product stream may contain anywhere from 50 to 90 volume percent steam.

The desorbed carbon from the stripping section is cooled and recycled to the top of the adsorption column whence it again passes down through the column. The recycled carbon may contain up to 5 weight percent of adsorbed water vapor which is conventionally removed in an upper section of the main column by the stripping action of the $C_1$ product fraction. The desorbed water vapor is then withdrawn from the column in admixture with the $C_1$ fraction.

It is apparent that the $C_1$ and $C_3$ product streams in the process just described may contain large amounts of steam. In addition, the product streams contain considerable amounts of entrained carbon. The amount and particle size composition of the carbon thus entrained depends upon a number of factors including the particle size composition of the carbon in the fluidized bed and the gas velocity through the bed. The amount of carbon entrained just above a bed may be as high as 20 lbs. per 100 cubic feet of gas and is generally about 1 to 2 pounds per 100 cubic feet. At a superficial gas velocity of about 1.2 feet per second, the particle size composition of the entrained carbon from a typical bed of fluidized activated carbon is shown in the following table.

*Table*

| Activated Carbon Particle Size in Microns | Fluidized Bed Composition, Wt. Percent | Activated Carbon Entrained Composition, Wt. Percent |
|---|---|---|
| 0–10 | 10 | 46 |
| 10–20 | 8 | 19 |
| 20–40 | 11 | 16 |
| 40–80 | 18 | 14 |
| 80+ | 53 | 5 |

For satisfactory operation of a fluidized activated carbon adsorption process it is necessary to effect better than 99.9% removal of the entrained carbon from the adsorber product streams. This high level of collection efficiency calls for very effective separating devices that are capable of handling extremely large volumes of gas. In addition, these devices must also be able to stand up under high temperatures and relatively high pressures. Further, the devices preferably should be continuous in operation and be characterized by low pressure drop performance.

Separators such as ultrasonic dust collectors, bag filters, frame filters, electrostatic precipitators, cyclones and multiclones have been considered for this operation, but all of these devices have one or more serious drawbacks from the standpoint of complete removal of entrained solids from gases. Some are too expensive for practical use, some are too inefficient, some are not continuous, some are inconvenient to operate, and some create undesirable pressure drops. Nevertheless, it is usually desirable to use some form of conventional equipment, preferably one or more cyclone stages, to remove the bulk of the entrained solids. However, cyclones are not adequate to effect the ultimate solids removal desired, and additional means must be resorted to.

It will be recalled that in addition to the activated carbon recovery problem, there is also the problem of condensing large amounts of steam and removing excessive sensible heat that are present in the different product streams. This fact early suggested the use of water as a scrubbing agent to simultaneously remove the carbon, condense the steam, and remove sensible heat from each of these product streams. This procedure, however, presents a number of complicating problems. In the first place, dilute carbon slurries, although very readily pumped by means of conventional equipment, contain amounts of water that are so large as to prohibit their introduction within the desorption section of the adsorption column. In other words, if the total steam condensed comprises the slurry water, some of the water must be removed from these slurries before the carbon can be readmitted to the column; otherwise, the large amounts of water associated with the carbon drastically upsets the proper functioning of the tower. Excessively dilute charwater slurries could be concentrated by conventional means such as settlers, filters, thickeners and boilers. However, equipment of this type have been found impractical. For example, the use of boilers to concentrate the slurry results in fouling of the exchanger surface by the char. Also, the char particle size is so small that settlers are impractical. Other equipment such as filters are expensive and discontinuous in operation.

Secondly, it is eminently desirable to avoid the use of conventional cooling water such as city water, sea water, etc., for removing char, steam, and sensible heat from adsorber product streams in scrubbing operations of the type described above, since these forms of cooling water generally contain mineral salts and other dissolved matter that deposit on the activated carbon and deactivate it. The present invention circumvents this problem by using the water vapor already present in the gas streams to serve as the scrubbing medium. In this connection, however, it has already been noted that when all of the water vapor in a gas stream is condensed for such a purpose, the carbon slurries thus formed may be too dilute for immediate utilization.

One method for condensing the steam present in a product stream from an adsorption unit consists in passing the stream through tube bundles, coils, etc., where the gas stream is cooled and the steam condensed in controlled amount by indirect heat exchange with a cooling medium such as city water, salt water, and the like. This procedure possesses a distinct disadvantage, however, in that the activated carbon or other solid materials present in the gas stream deposit upon the tubes, coils, etc. and thereby reduce the heat transfer efficiencies of such apparatus.

It is an object of the present invention to avoid the difficulties described above when handling gas streams that contain non-condensing gaseous constituents, condensable vapors, excessive sensible heat, and finely divided solids. It is a further object of the present invention to provide a method for (1) scrubbing substantially all of the solids from such a gas stream by means of a scrubbing medium formed in situ through condensation of a part of the condensible vapors, (2) forming in controlled concentration an uncontaminated slurry of the solids that is capable of being pumped by means of conventional equipment and (3) removing any residual excessive sensible heat and separately condensing the remaining condensible vapors in the absence of solids and thereby isolating the non-condensing gas product. It is a particular object of the present invention to provide a process of the type just described for the purpose of processing the product streams from an activated carbon type fractional adsorption tower and for recovering the steam and carbon in usable forms.

The present invention may be best understood by reference to the attached figures.

Figure 2 depicts how the present invention may be employed in conjunction with an adsorptive fractionation process for fractionating a mixture of hydrocarbon gases.

Figure 1:
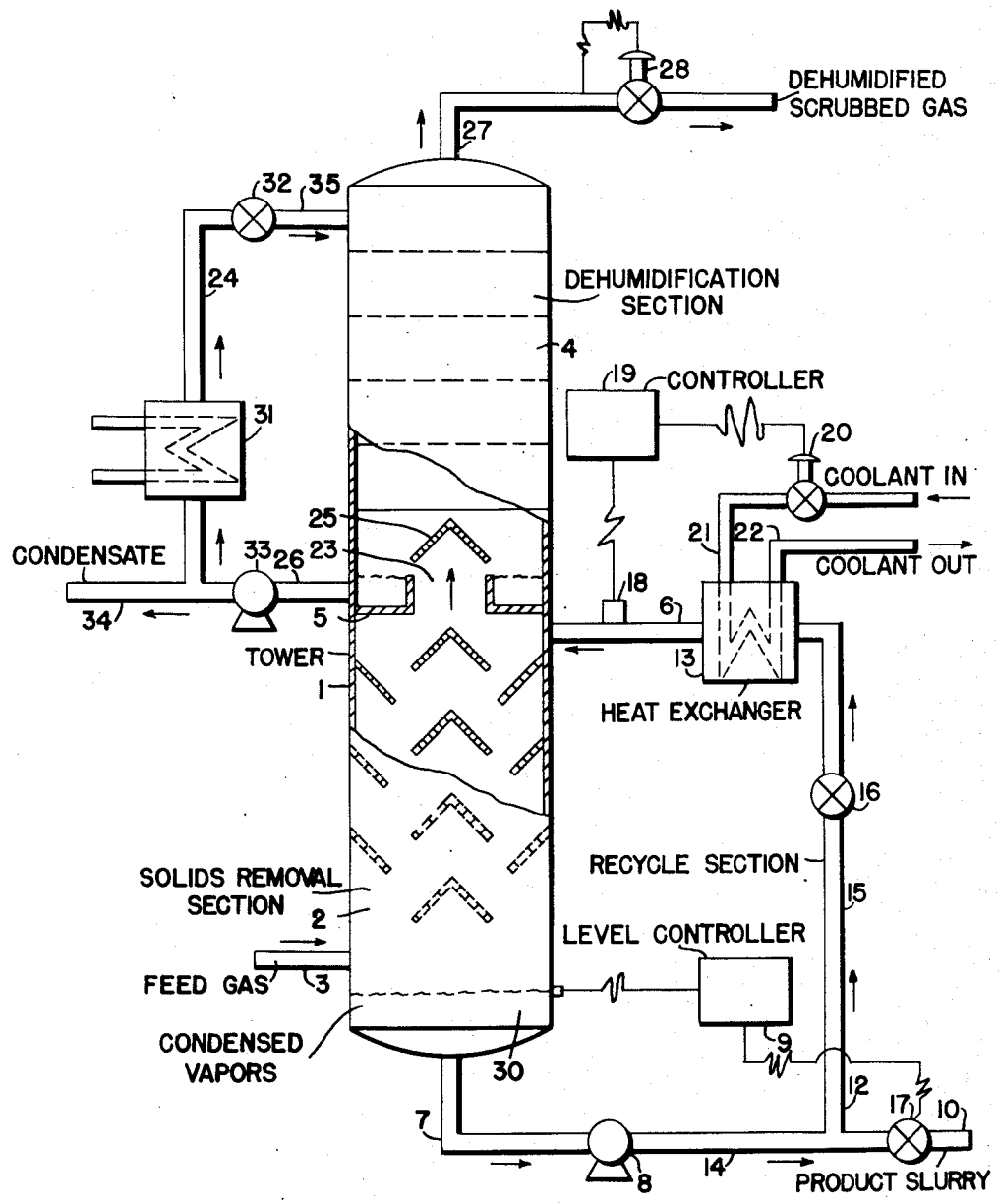
Figure 1 illustrates a preferred embodiment of the present invention for removing finely divided entrained solid particles and a condensible vapor from a gasiform stream that also contains a non-condensing gas.

Referring first to Figure 1, a feed gas containing non-condensing gas or gases, entrained solid particles and a large amount of condensible vapors is introduced through line 3 to tower 1 at a point just above the bottom of the tower. The feed gas enters at a temperature equal to or above the dew-point of the condensible vapors. It is assumed that the weight ratio of condensible vapor to entrained solids in the feed gas is greater than that desired in the slurry produced. Tower 1 contains a lower solids removal or scrubbing section 2 and an upper dehumidification section 4 separated by condensate collecting tray 5. Liquid slurry, formed by condensing a part of the vapors and by scrubbing out the solid particles in the feed gas, is introduced to tower 1 through line 6 at a point near the top of the solids removal section 2. The slurry flows down through the tower countercurrently to and in direct contact with the rising feed gas. This section of tower 1 is provided with vapor-liquid contacting means such as perforated plates or baffles of a character that is not susceptible to becoming clogged or packed with the solid particles. Conventional disc and doughnut baffles are particularly attractive for this type of service.

The slurry collects in the bottom 30 of the solids removal section and is withdrawn from the tower through line 7 by pump 8. A level of slurry is maintained in the bottom of tower 1 as for example by a liquid level controller 9 which actuates valve 17. Pump 8 discharges the slurry through line 14, a portion of which is withdrawn as slurry product through line 10, and the remainder recycled through lines 12 and 6, and heat exchanger 13 to the top of the solids removal section.

The physical dimensions of the solids removal section may be determined by the application of certain principles. For example, allowable vapor velocities as limited by operating pressure, liquid entrainment, and pressure drops would be used to size the tower.

The mass flow rate and temperature of the slurry entering the top of the solids removal section are governed by several factors.

First, the slurry must be sufficient in flow rate to completely and continuously wet the liquid-gas contacting surface within the section. It is preferred that as large a rate as possible be employed without causing flooding, since the efficiency of this particular operation is thereby greatly enhanced.

Second, the quantity and temperature of the recirculated slurry, as it enters the top of the solids removal section, must be such that the slurry upon contacting the feed gas is capable of condensing enough of the condensible vapors contained therein to maintain the desired relative amounts of solid and liquid constituents within the slurry withdrawn through line 7. In this connection it will be noted that the recirculated slurry must be capable of removing heat from the feed gas until the latter reaches a temperature sufficiently below its initial dew-point such that the desired amount of condensible vapors are condensed to produce the required slurry concentration.

It is apparent that the consistency or solids concentration in the slurry desired in line 10 may vary markedly, depending to a great extent upon the use to which the slurry is to be put. For example, it may be desirable to pump an activated carbon slurry to the desorber heating section of an adsorptive fractionating tower. Further, it may be desired to obtain a highly concentrated slurry such that the efficiency of the desorption and dehydrating sections of the adsorber will not be impaired due to the cooling effect of the slurry added. At the same time, an excessive concentration of solids in the slurry might present a pumping problem. The composition will also depend, of course, on the nature of the liquid and solid constituents of the slurry.

It is a primary object of the present invention to produce a slurry of controlled solids concentration that can be readily pumped by using conventional pumps, valves and lines. In any event, the composition of a slurry desired for any given case can be ascertained by experimentation. In the desorption of gaseous hydrocarbon products from activated carbons, for example, the desired concentration of carbon in the slurry recovered from the wet adsorber product streams must be held in the range of 0.2 to 0.5 lb. carbon per gallon of slurry.

Once the critical composition of the slurry in line 7 has been decided upon and once the temperature and composition of the feed gas are known, the mass flow rate and temperature of the recirculated slurry as it re-enters the solids removal section is fixed. It will be recalled, of course, that the required slurry recirculation rate and the feed gas rate and condition together determine the physical dimensions and characteristics of this part of the tower as described earlier.

The flow rate of the slurry passing through recycle section 15 may be controlled by valve 16 and by the operation of pump 8.

Recycle section 15, illustrated in the figure, comprises a pump 8, lines 12 and 6, valve 16, heat exchanger 13 and a temperature measuring means 18 located in line 6 just prior to the point where this line enters tower 1. The temperature measuring means may be in the form of a thermometer, a thermocouple, a thermopile, or any other conventional instrument suitable for the purpose. It is preferably connected to a controller 19, and a flow control valve 20 located in line 21 or 22. With this arrangement it is possible to control the temperature of the recirculated slurry by regulating the amount of coolant passing through the heat exchanger 13. It is felt that a detailed description of this heat exchange apparatus is unnecessary, since it is conventional and well known in the art.

After passing through the solids removal section, the feed gas flows through opening 23 into dehumidification section 4. Here, substantially all of the remaining condensible vapors are condensed and collected without contamination. This operation may be carried out in several ways, one method being depicted in the figure. As shown, the feed gas is contacted directly with a liquid coolant which is substantially identical chemically with the condensible vapors but referred to separately as liquid coolant for the sake of clarity. In fact, as will be seen, the direct coolant may be continuously formed by the condensing operation.

Dehumidification section 4 is preferably provided with vapor-liquid contacting means such as bubble-cap plates, perforated plates, pierced plates, packing and the like. Any such conventional contacting means can be employed without fear of plugging, clogging, etc., since substantially all of the solids in the feed gas are removed in the preceding solids removal section.

Referring again to the figure, it will be seen that the feed gas upon entering dehumidification section 4 flows upward around deflector 25 and then contacts the liquid coolant with direct heat exchange. The liquid coolant enters tower 1 at a point near the top of the dehumidification section and flows countercurrently to the rising gas stream. The coolant and condensed vapors mix and flow into collecting tray 5. Deflector 25, in conjunction with tray 5, prevents any of the downflowing coolant and condensate from flowing back into the solids removal section. The combined liquid product, i. e. coolant and condensate, is withdrawn from tray 5 by pump 33 through line 26. A portion of the liquid is withdrawn from the process as product through line 34 by means of instruments not shown which control the liquid level on tray 5. A second portion is recycled through indirect cooling exchanger 31, line 24 and valve 32 to the top of the dehumidification section via line 35. The mass flow rate of the recycled portion is controlled so as to provide adequate wetting within the dehumidification section without causing flooding. The temperature and quantity of the recycle stream is controlled so as to condense the desired amount of the vapors present within the section.

Alternatively, dehumidification section 4 may consist of a conventional indirect heat exchange condenser and gas-liquid separating drum in which the feed gas vapors are condensed by indirect contact with a suitable coolant or refrigerant and the resulting gas and condensate separated. However, the dehumidification section 4, as shown, is preferred since upset operating conditions might temporarily pass solids through opening 23 to foul any exchanger substituting for section 4.

The dehumidified and scrubbed non-condensing gaseous constituents of the original feed gas pass out the top of tower 1 through line 27 to be stored or handled as otherwise desired. A pressure regulating valve 28 is preferably positioned in overhead line 27 to control the pressure within the tower.

When water is the condensible vapor in the feed gas, it is usually highly desirable to eliminate exchanger 31 and recycle line 24, and to add cooling water directly to the tower via line 35. The cooling water removed from the tower via line 34 would return directly to the cooling water source, which might be a general-purpose cooling tower system. Such cooling water would usually contain mineral salts which would deactivate an adsorbent on being deposited thereon. Thus, the advantage of the present invention to prevent this adsorbent contamination is obvious. Also, when using indirect cooling water and exchanger 31, any leakage in this exchanger would not result in adsorbent contamination. The use of direct cooling water to dehumidification section 4 has marked economic advantage. Exchanger 31, and in some cases, pump 33 are eliminated. Also, the allowable temperature rise of the cooling water is increased and pumping requirements at the cooling water source are decreased.

As mentioned earlier, a specific application of the present invention lies in the process for fractionating hydrocarbon gas mixtures by the use of a fluidized bed of an adsorbent such as activated carbon. For the case where a mixture of $C_1$, $C_2$ and $C_3$ hydrocarbons is fractionated using activated carbon and where separate streams of each of these hydrocarbons are produced, it has been further pointed out that the $C_1$, $C_2$ and $C_3$ streams generally contain large amounts of steam as well as substantial amounts of finely divided carbon.

The problem of fractionating such mixtures is an important one in the petroleum industry where refinery gas streams containing $C_1$, $C_2$ and $C_3$ hydrocarbons are produced in large volume by various refining operations. A particularly attractive method for fractionating these streams into $C_1$, $C_2$, and $C_3$ fractions is the fractional adsorption process involving fluidized activated carbon that has been mentioned earlier. The operation of this process is readily apparent in Figure 2, where a conventional refinery feed gas containing $C_1$, $C_2$, and $C_3$ fractions flows through line 40 to an intermediate point of tower 41 where it is contacted with a fluidized bed of activated carbon that moves down the tower.

Tower 41 comprises an adsorption section 42 extending from the top of the tower to the feed point, a rectification section 43 immediately below the feed point, and a desorption or heating and stripping section 44 between the rectification section and the bottom of the tower.

Upon entering tower 41, the feed gas rises through adsorption section 42 where the $C_2$ and $C_3$ fractions are adsorbed by the carbon. The $C_1$ fraction continues up the tower and leaves through overhead line 45. A cyclone-type separator 46 may be employed to remove a large part of any entrained carbon particles in the $C_1$ stream.

The activated carbon and the adsorbed $C_2$ and $C_3$ fractions pass down into rectification section 43, where they are contacted with gases being refluxed from desorption section 44. As a result, the $C_2$ fraction is preferentially desorbed and is withdrawn from the tower through line 47. This fraction may be further rectified if necessary in an auxiliary rectification section or tower, not shown.

The carbon particles and the adsorbed $C_3$ fraction flow from the rectification section into desorption section 44 where they are met with steam from line 48 and temperatures of about 500° F. as generated by a suitable heating means 49. The $C_3$ fraction is thereby desorbed and withdrawn through line 3. The desorbed carbon in turn flows out of the tower through line 50 and is recirculated to the top of adsorption section 42.

As the carbon in line 50 enters the adsorption section it flows through dehydration zone 51 where steam adsorbed by the carbon in the desorption zone is desorbed by the rising $C_1$ gas fraction and removed through line 45. The dehydrated carbon next flows through cooling zone 52 where it is cooled to regain its adsorptive capacity for hydrocarbons. Any suitable means such as cooling coils 53 may be used to cool the carbon.

The $C_1$ fraction produced in this manner consists primarily of methane and hydrogen with small amounts of nitrogen and lighter gases; the $C_2$ fraction consists essentially of ethane and ethylene; and the $C_3$ fraction is made up almost entirely of propane and propylene.

As explained earlier, the $C_1$, $C_2$, and $C_3$ streams may contain up to 20 lbs. of carbon per 100 cu. ft. of gas and up to 90 percent by volume of steam. The carbon concentration in each stream, however, will not usually exceed 2 lbs. per 1000 cu. ft. of gas. In addition, each stream is generally at a temperature of about 400–500° F. and under a pressure of about 50 to 100 p. s. i. g. as it leaves the adsorption tower.

After the $C_1$, $C_2$, and $C_3$ streams pass from the adsorption tower, they must be processed in a way such that the steam and activated carbon contained therein are removed and recovered. In addition, the carbon must be returned to the adsorption tower in a form that permits of ready re-introduction therein. Further, the carbon must be kept as free from contamination as possible and must be recovered with efficiencies of at least 99.9%.

The process of the present invention successfully achieves all of these objectives. It makes possible the treatment of each fraction so as to produce a substantially carbon-free hydrocarbon fraction, water, and a carbon-water slurry. According to the present invention the slurry in each instance must contain no more than about 0.5 lbs. of carbon per gallon of slurry and no less than about 0.2 lb. of carbon per gallon of slurry. Slurries that are more concentrated than this range are not readily pumpable while slurries more dilute than this range tend to upset an adsorption tower upon introduction therein. It is particularly contemplated that the slurries produced by the present process be introduced within the desorption section of a given adsorption column.

It will be noted that for successful operation of the present invention, it is necessary that the $C_1$, $C_2$ and $C_3$ streams contain more steam per pound of carbon than is required in the resulting slurries. Since each of the slurries must contain between about 0.2 and 0.5 lb. of carbon per gallon of slurry, it necessarily follows that the $C_1$, $C_2$ and $C_3$ streams must contain at least about 16 lbs. of steam per lb. of carbon. The streams flowing from an adsorption column meet this requirement.

For the purpose of illustrating a mode of working the present invention, an example will now be given showing how a $C_3$ stream from an activated carbon fractional adsorption column can be processed. This stream, as it leaves the adsorption column, will conventionally have a temperature of, for instance, 500° F. and be under a pressure of about 75 p. s. i. g. It will be assumed to contain about 85 mol percent steam and about 1 pound of carbon per 1000 cu. feet of gas and to have a flow rate of 4500 pound mols per hour.

Referring again to Figures 1 and 2, the $C_3$ fraction or stream is withdrawn from desorption section 44 of tower 41 through line 3 and constitutes the feed stream to tower 1. Here it is first countercurrently and directly contacted with about 1300 gallons per minute of a carbon-water slurry in solids removal section 2. The slurry enters the section at a temperature of about 307° F. and leaves the section at about 310° F. Substantially all of the carbon in the feed gas is carried out of the section along with about 10,000 pounds of water freshly condensed from the feed gas. The resulting combined slurry has about 0.5 pound of carbon per gallon of slurry. It will be noted here that a carbon slurry that is capable of being pumped and is also capable of being directly reintroduced to the desorption section of a conventional fractional adsorption column must contain no more than about 0.5 lb. solid per gallon of slurry and no less than about 0.2 lb. per gallon.

About 10,600 pounds of product slurry is withdrawn from the apparatus through line 19 per hour.

The scrubbed and partially dehumidified feed gas is then contacted with about 2,000 gallons per minute of water (previously condensed steam) within dehumidification section 4. When the entering water has a temperature of about 100° F., the water product in line 26 will have a temperature of about 170° F. About 58,800 pounds of water per hour is withdrawn through line 34, and about 660 lb.-mols of $C_3$ and 200 lbs. of water per hour at 120° F. is withdrawn through line 27.

It will be noted that numerous variations may be incorporated and used in the apparatus and process described without departing from the spirit of the present invention. For example, if the temperature and/or composition of the feed gas in line 3 changes in value, conventional instruments and control devices may be employed to correspondingly vary the temperature and/or flow rate of the slurry in line 6 or the liquid coolant in line 24. In addition, a wide number of non-condensing gas-condensible vapor-solid particle systems may be processed. For example, the $C_2$ and $C_1$ streams from a charcoal fractional adsorption column can be treated in a manner similar to the $C_3$ stream. Again, the hydrocarbon product stream from a fluid hydroformer or hydrocarbon synthesis unit can be similarly processed. A wetting agent may be added to the circulating slurry in the lower tower section to improve the efficiency of solids removal. Such a wetting agent should be completely combustible when the solid is an adsorbent such that said agent may be removed by conventional adsorbent reactivation methods.

What is claimed is:

1. A process for dehumidifying and scrubbing a gas stream containing a non-condensing gas, a condensible vapor and finely-divided entrained solid particles which comprises passing the gas stream countercurrently in a gas-liquid contacting zone to a pumpable slurry comprised of liquid components and solid components, said liquid components and solid components being derived from the condensible vapor and solid particles present in the gas stream, said pumpable slurry being present within said gas-liquid contacting zone in an amount sufficient to thoroughly wet the gas-liquid contacting surfaces contained within said zone and thereby scrub said solid particles from said gas stream, said pumpable slurry being sufficiently lower in temperature than said gas stream so as to condense a predetermined portion of said condensible vapors within said gas-liquid contacting zone and thereby form additional pumpable slurry, recirculating at least a portion of the combined slurry to said vapor-liquid contacting zone, withdrawing the remaining slurry as a first product, withdrawing the scrubbed gas stream from said gas-liquid contacting zone and dehumidifying the scrubbed gas stream by condensing and collecting condensible vapors contained therein.

2. Process as defined in claim 1 in which the non-condensing gas is a hydrocarbon gas not condensible at ordinary pressures and temperatures, the condensible vapor is steam and the solid particles are particles of finely divided activated carbon.

3. In a process for fractionating a mixture of gasiform hydrocarbons into a plurality of gasiform hydrocarbon fractions by contacting the mixture with a bed of fluidized activated carbon particles in a tower including a desorption zone and wherein the gasiform hydrocarbon fractions contain less than about 20 lbs. of activated carbon particles per 100 cu. ft. of gas and at least about 16 pounds of steam per pound of carbon the improvement which comprises countercurrently contacting a gasiform hydrocarbon fraction with a carbon-water slurry containing from about 0.2 to 0.5 lbs. of carbon per gallon of slurry whereby substantially all of said activated carbon particles are removed from said fraction, said slurry being continuously formed from said fraction, controlling temperature of said slurry to condense enough of the steam in said fraction so as to form additional slurry containing between 0.2 and 0.5 lbs. of carbon per gallon of slurry, recirculating a portion of the total slurry, withdrawing and pumping remainder of said slurry to said desorption zone, cooling the substantially carbon-free gasiform fraction to condense steam contained therein, collecting said condensate and withdrawing a substantially carbon-free and dehumidified hydrocarbon fraction.

ROBERT S. WOOD.

References Cited in the file of this patent
UNITED STATES PATENTS

| Number | Name | Date |
| --- | --- | --- |
| 2,323,047 | Jewell | June 29, 1943 |
| 2,523,149 | Scheeline | Sept. 19, 1950 |
| 2,584,296 | Scheeline | Feb. 5, 1952 |
| 2,585,659 | Kilpatrick | Feb. 12, 1952 |